L. Shipman,
Milk Cooler.
No. 10,054.  Patented Mar. 22. 1870.
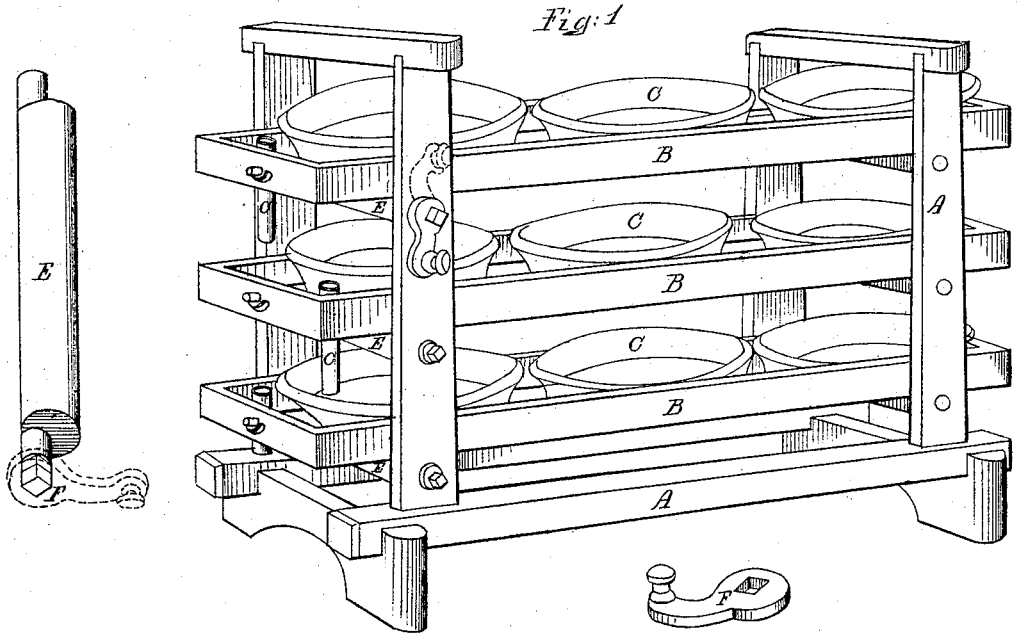
Fig: 1
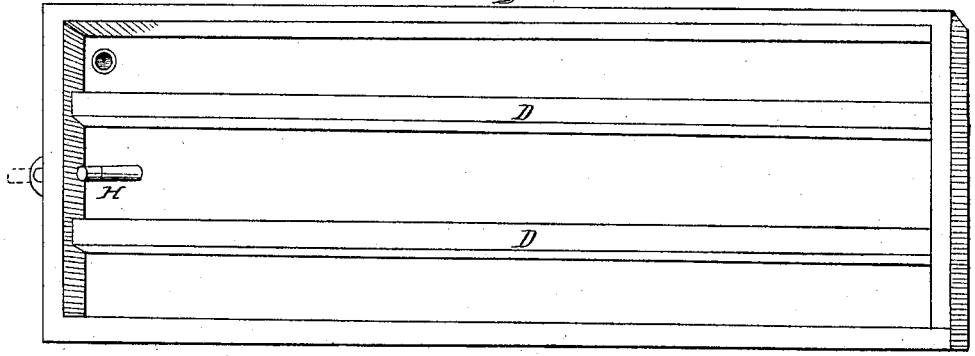
Fig: 2
Witnesses
L. M. Brown
Henry W. Robie
Inventor
Lawson Shipman
pr J. C. Robie
his attorney

United States Patent Office.

LAWSON SHIPMAN, OF BARKER, NEW YORK.

Letters Patent No. 101,054, dated March 22, 1870.

IMPROVEMENT IN MILK-RACKS AND COOLERS.

The Schedule referred to in these Letters Patent and making part of the same.

I, LAWSON SHIPMAN, of Barker, in the county of Broome, in the State of New York, have invented certain Improvements in Milk-Racks and Coolers, of which the following is a specification.

The nature of my invention consists in the construction and arrangement of a rack provided with water-shelves, placed successively over each other, and capable of holding a sufficient quantity of water for cooling the milk, which is held in the ordinary pans in such a manner that the water may be graduated to the required height, and remain at that point, although the water should continue to flow in.

It also consists in arranging the shelves with a hinged joint at one end, and the other resting upon the top of a cam, which may be operated so as to depress the free end of the shelf, for the purpose of drawing off the water when the pans are removed, and raised to a level again when used.

Figure 1 is a perspective view of a rack and cooler, embodying my invention.

Figure 2 is one of the shelves detached, showing the longitudinal pieces on the bottom for the pans to sit upon.

A is the rack or stand, provided with a tier of box-shaped shelves for holding water, which rack should be constructed in a substantial manner, to prevent the agitation of the milk.

B B are the shelves, which should be made deep enough for the water to reach nearly to the edges of the pans c c.

On the bottom of each shelf are attached two longitudinal strips, D D, for the pans to sit upon, so that the water may have a free circulation under them.

The shelves are supported on pivots at one end, and the other resting upon a cam, E, which may be turned up or down by means of a crank-key, F, whereby the free end of the shelf may be depressed, for the purpose of drawing off the water through an aperture, H, in the end.

The free end of each shelf has a movable conducting-tube, G, inserted through the bottom, the upper end of which projects far enough above to retain the required depth of water.

One or more pans of milk are then placed upon each shelf, and the tubes raised or depressed according to the required height of the water. The vessels are then filled, and, if necessary, supplied with ice. A continuous flow of water may be let in, which will successively pass through each tube and vessel, thereby insuring an even temperature of the milk for any length of time.

I claim the combination and arrangement of the water-shelves B B, with the conducting-tubes G G, cams E E, and crank-key F, all being constructed substantially as herein described and for the purpose set forth.

LAWSON SHIPMAN.

Witnesses:
C. B. MILLER,
M. HAGAMAN.